Figures 1, 2:
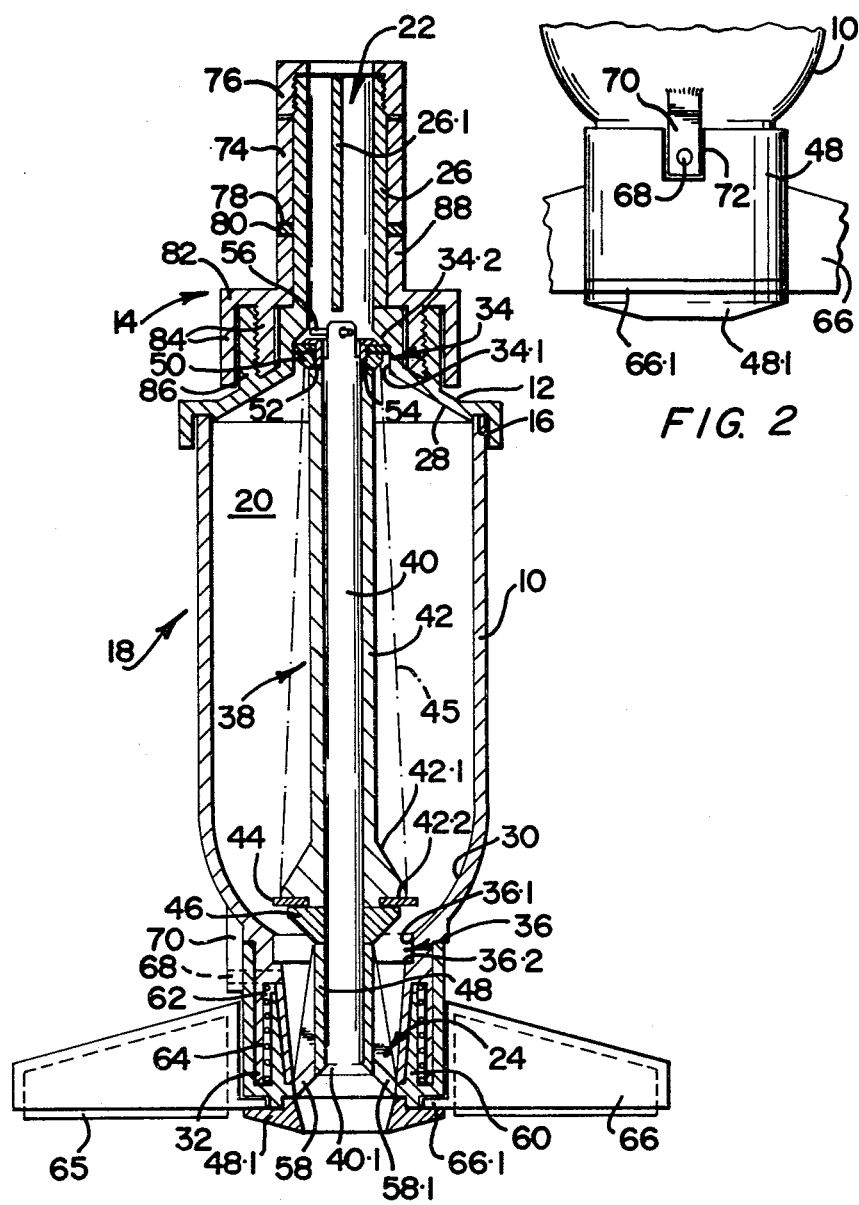

United States Patent [19]

Coetzee

[11] 4,427,041

[45] Jan. 24, 1984

[54] DISPENSING AND METERING DEVICES FOR LIQUIDS

[76] Inventor: John C. Coetzee, P.O. Box 12081, Jacobs, 4026, South Africa

[21] Appl. No.: 291,957

[22] Filed: Aug. 11, 1981

[30] Foreign Application Priority Data

Aug. 12, 1980 [ZA] South Africa .................. 80/4918
Mar. 25, 1981 [ZA] South Africa .................. 81/2010

[51] Int. Cl.³ ............................................. B65B 3/06
[52] U.S. Cl. ................................. 141/294; 141/362; 222/365; 222/453; 222/442
[58] Field of Search ............... 222/442, 446, 447, 449, 222/451, 453, 567, 365; 277/34, 120, 121; 289/338, 196, 8; 141/312, 285–310, 351–362, 115

[56] References Cited

U.S. PATENT DOCUMENTS

| | | | |
|---|---|---|---|
| 2,096,499 | 10/1937 | Mandell | 141/295 |
| 2,679,347 | 5/1954 | Franz | 141/295 |
| 2,721,089 | 10/1955 | Shames | 285/8 |
| 3,109,546 | 11/1963 | Baruh | 222/453 |
| 4,180,106 | 12/1979 | Coetzee | 141/294 |
| 4,314,657 | 2/1982 | Perakis et al. | 222/442 X |

FOREIGN PATENT DOCUMENTS 593302 10/1947 United Kingdom .
674139 6/1952 United Kingdom .
852315 10/1960 United Kingdom .

*Primary Examiner*—Houston S. Bell, Jr.
*Attorney, Agent, or Firm*—Lowe, King, Price & Becker

[57] ABSTRACT

A dispensing and metering device for liquids has a valve arrangement controlling the dispensing so that a metering chamber can be filled with a quantity of liquid and this quantity of liquid can then be drained. To ensure suitable metering, parts of the valve arrangement may remain in suitable sockets at inlet and outlet ends of the chamber so that liquid cannot flow continuously from the inlet to the outlet, in use. The outlet is provided below the chamber and an air bleed hole opens into the device between the chamber and outlet to allow air to enter the chamber to replace liquid being dispensed. The bleed hole can be valveless. In order to attach the device to a bottle, the device may have a resiliently deformable sleeve expansible radially into engagement with the interior of a bottle neck by axial compression of the sleeve. The device thus fits many bottles.

17 Claims, 2 Drawing Figures

DISPENSING AND METERING DEVICES FOR LIQUIDS

This invention relates to dispensing and metering devices and, more specifically, to devices for delivering measured quantities of liquids from containers, such as inverted bottles.

In U.S. Pat. No. 4,180,106, the applicant discloses a dispensing and metering device having a threaded attachment means to secure the device to a threaded bottle and a housing defining a chamber and having an inlet and an outlet so that the chamber can be filled through the inlet with liquid from a container secured to the device by the attachment means and can be drained through the outlet. The device included a valve means movable from a first condition in which it isolates the chamber from the outlet and opens the inlet to a second condition in which it closes the inlet and allows liquid to flow from the chamber to the outlet. A valveless air bleed hole passes through the valve means for introducing air into the chamber to replace liquid flowing from the outlet when the valve means is moved to the second condition.

While this device has been successful in its commercial form, it has proved desirable to modify and improve certain aspects of the device. For example, the use of the threaded attachment means limited the number of bottles with which any one device could be used, sugar deposits from alcohol dispensed by the device could sometimes make moving parts of the device stick together and difficult to clean, particularly when such deposits occur on relatively movable parts of the valve means, and the air bleed in the valve means could also be affected by such deposits.

According to one embodiment of the invention, there is provided a dispensing and metering device comprising attachment means to secure the device to a container, a housing defining a chamber and having an inlet and an outlet so that the chamber can be filled through the inlet with liquid from a container secured to the device by the attachment means and can be drained through the outlet, valve means movable from a first condition in which it isolates the chamber from the outlet and opens the inlet to a second condition in which it closes the inlet and allows liquid to flow from the chamber to the outlet, and air bleed hole for introducing air into the chamber to replace liquid flowing from the outlet when the valve means is moved to the second condition, the air bleed hole opening into the interior of the housing between the chamber and the outlet.

Each though the air bleed hole is provided where the liquid being dispensed will flow past it, experiments have shown that, provided that the hole is suitably sized, significant escape of liquid through the hole is prevented. Suitable dimensions for the hole can be determined relatively easily. Furthermore, it is totally unnecessary to provide the hole with its own control valve, even though such valves are essential in the majority of commercially available devices.

The outlet of the device may comprise an opening defined by a throat beneath the chamber and a valve seat may be provided by a surface in or adjacent to the throat with the air bleed hole opening into the throat. The valve means may then have a suitable seal for engaging the outlet valve seat between the chamber and the air bleed hole.

The air bleed hole may pass through a boss projecting outwardly from the housing, and the valve means may have an outlet nozzle member movable to operate the valve means and including a formation co-operating with the boss for preventing rotation of the nozzle member.

The outlet nozzle member may be guided by the throat defining the outlet and may be formed by at least part of a cap including a sleeve fitted over and guided by the throat. A press bar may extend from opposite sides of the cap for engagement by a glass, in use, to raise the cap, and thus the valve body, and so to close the inlet and to allow liquid to flow from the outlet. The nozzle member can include a suitable nozzle arrangement to guide liquid from the outlet and to prevent it from flowing onto the press bar. The press bar may be rotatable with respect to the housing, for example by being partly located in an annular groove in the nozzle member to prevent twisting of the nozzle member by movement of the press bar.

A spring may be provided for biassing the valve means to the condition in which the inlet is open and the outlet is isolated from the chamber.

The attachment means of the device may comprise a resiliently deformable sleeve located around an inlet throat, and a stop and a shoulder which are movable one towards another to compress the sleeve between them and to cause radial expansion of the sleeve, the sleeve being locatable in a bottle neck so that the sleeve can be expanded radially into engagement with the interior of the bottle neck to attach the device to the bottle neck.

The stop may be formed by a removable element secured to the inlet throat at the end region thereof furthest from the chamber. This allows elements and sleeves of different sizes to be fitted about the inlet throat to suit different bottles.

The shoulder may be provided by a compression assembly for compressing the sleeve, for example by a ring encircling the inlet throat and movable towards the stop by a compression member of the assembly, which member is itself movable towards the stop. For example, the compression member may be screwed onto a threaded formation associated with the housing to enable it to be screwed towards and away from the stop. The ring may then slidably engage a contact surface on the compression member to prevent or restrict twisting of the sleeve as the compression member is rotated. The shoulder may alternatively be provided on the compression member but it may then be necessary for the sleeve to incorporate a slip ring for engaging the compression member to prevent twisting of the sleeve as the compression member is rotated.

In any event, it is desirable for the resiliently deformable sleeve to be received wholly within the bottle neck when it is expanded radially and the compression member may thus be provided with a neck which extends for a suitable distance into the neck of the bottle before the sleeve is compressed.

The inlet throat may be a tube formed integrally with a closure cap of the housing of the device and may have a partition dividing the throat since this facilitates flow of liquid from a bottle into the chamber.

The housing of the device may have at least partly cylindrical sockets at opposite ends of the chamber and the valve means may have annular portions for fitting closely in the cylindrical parts of respective sockets and arranged so that at least one annular portion is in a cylindrical part of a socket during substantially the whole of the travel of the valve means.

The annular portions of the valve means may touch the walls of the cylindrical parts of the sockets as they move but are preferably dimensioned so that there is a small clearance. In either case, the arrangement should be such as to prevent any significant flow of liquid between the annular portions and the socket walls when the annular portions are within the cylindrical parts of the sockets and the valve means moves rapidly between the first and the second conditions. With this arrangement it should be possible to dispense substantially uniform quantities of liquid from the device.

In fact, parts of the valve means may remain substantially in one or other of the sockets as the valve means moves between the first and second conditions so that the liquid cannot flow continuously from the inlet to the outlet and also such that, once the valve means has allowed the chamber to fill, the quantity of liquid in the chamber will normally remain substantially constant until it is allowed to empty by operation of the valve means.

The annular portions of the valve means may provide surfaces for engaging valve seats in the sockets.

An embodiment of the inventon will now be described, by way of example, with reference to the accompanying drawing, in which FIG. 1 is a cross-sectional view through a dispensing and metering device showing the device in a dispensing condition; and FIG. 2 is a side view of part of the device of FIG. 1.

The device shown in the drawing comprises a tubular housing member 10 which has one end partially closed by a closure cap 12. The closure cap is bonded in place and carries attachment means 14 for fitting the device to the neck of a bottle. The cap 12 is provided with an inner shoulder 16 for engaging the end of a cylindrical tubular wall of the housing member 10 to locate the cap accurately in position with respect to the housing member.

The housing member 10 and cap 12 together form a housing 18 defining a chamber 20. The housing has an inlet 22 and an outlet 24 so that the chamber can be filled through the inlet with liquid from an inverted bottle secured to the device by the attachment means 14 and can be drained to allow the liquid to flow through the outlet. The inlet is formed by an inlet throat in the form of a tube 26 having a central partition 26.1, the tube 26 forming the central part of the attachment means. The inlet allows rapid flow of liquid from a bottle into the chamber while allowing air to flow from the chamber.

The cap 12 has an inner frusto-conical wall 28 diverging away from the inlet 22 and the housing member 10 has a curved bottom wall section 30, this wall section being curved and diverging away from the outlet 24. A throat 32 formed by a downwardly and outwardly tapering annular part of the housing member extends away from the wall section 30 and the inner surface of its lower end defines the outlet 24.

At least partly cylindrical inlet and outlet sockets 34 and 36, respectively, are formed in the housing 18 at opposite ends of the chamber 20. Each socket has a cylindrical part 34.1 and 36.1 terminating in a frusto-conical valve seat 34.2 and an annular flat valve seat 36.2, respectively.

The device shown also includes valve means 38 movable between a first condition in which it closes the inlet and places the chamber in fluid communication with the outlet, and a second condition in which it isolates the chamber from the outlet and opens the inlet.

The valve means 38 has a central cylindrical shank 40 encircled by a tubular metering sleeve 42 which has a downwardly tapering substantially frusto-conical lower end 42.1 containing an annular recess 42.2 receiving a lower annular valve means portion in the form of a disc-like silicone rubber seal 44. The seal 44 is trapped in the recess 42.2 by a locating collar 46 held against the sleeve 42 by a tubular part of an outlet nozzle member 48. The member 48 is located between the collar 46 and a peripheral retaining rinm 40.1 on the shank 40.

At its upper end, the valve means 38 has a locating support 50 resting on top of the sleeve 42 and supporting an upper annular valve means portion in the form of a silicone rubber seal 52. The seal 52 is held in place by a clamp member 54 which is trapped on the shank 40 by a pin 56 which is a press fit in an opening in the top portion of the shank. Various components of the valve means are thus trapped on the shank 40 between the rim 40.1 and the pin 56.

The seals 44 and 52 are dimensioned to fit closely within the cylindrical parts 36.1 and 34.1 of the sockets 36 and 34, respectively, and are spaced so that at least one of the seals is at least partly in a cylindrical part of a socket at all times during the movement of the valve body 38. The clearance between the seals and peripheral walls defining the cylindrical parts of the sockets is small enough to ensure that there is no significant passage of liquid through this clearance during movement of the seals in the respective cylindrical parts when the valve means is moved rapidly between the first and second conditions.

The seals 44 and 52 are movable into engagement with the seats 36.2 and 34.2, respectively, to control liquid flow when the valve means is in its first and second conditions. However, in some cases the seal 52 may be able to close the inlet adequately in the second condition simply by fitting into a suitable socket 34 and contact of the seal with a valve seat 34.2 may be unnecessary.

It will be appreciated that if the same cap 12 and housing member 10 are retained, the effective volume of the chamber 20 can be selected by correct selection of the volume of the sleeve 42 or by providing a filler piece 45 (shown in chain lines) around the sleeve. In this regard, it is relatively simple to enlarge or decrease the effective volume of the central portion of the sleeve and thus to vary the effective volume of the chamber. This means that different quantities of liquid can be dispensed simply by changing a single part of the device.

The outlet nozzle member 48 is a cap having an outer sleeve fitting slidably over the throat 32 and guided for movement by the throat 32. The nozzle member has a spider arrangement 58 comprising a plurality of webs spaced around the stem while leaving openings 58.1 through which liquid can pass from the outlet 24. The nozzle member also has an annular upwardly extending projection 60 extending into a substantially triangular recess 62 between inner and outer walls of the throat 32. The projection 60 is shaped to fit snugly against the inner surface of the throat 32 when the nozzle is raised to the position shown for inhibiting ingress of liquid between the projection and the throat.

An annular spring chamber is defined in the recess 62 radially outwardly of the projection 60 and receives a helical spring 64 which biasses the nozzle downwardly, thus biassing the seal 44 towards the valve seat 36.2.

A press bar 66 having rubber pads 65 extends from opposite sides of the cap and can be engaged by a glass for lifting the nozzle member, and thus the entire valve means, against the action of the spring 64. The press bar has an annular inwardly extending flange 66.1 fitting in a groove formed between the cap and a nozzle insert 48.1 of the nozzle member 48 to retain the press bar and is rotatable about the member 48.

In order to allow air to enter the chamber to replace liquid flowing from the chamber when the device is in the position shown, an air bleed hole 68 is provided in the housing member 10 between the valve seat 36.2 and the outlet 24. This hole is a substantially horizontal radially extending hole passing through the housing member and through an outwardly projecting boss 70 at the exterior of the housing. In practice, it will be found that the rate of flow of liquid from the device can depend to a considerable extent on the size of the hole as well as on openings 58.1. A suitable hole size can be determined by simple experiment.

The spring chamber 62 can extend to the hole 68 to allow air to enter and leave the chamber 62 in operation of the device.

As the boss 70 projects from the housing in the region of the nozzle member 48, a formation such as slot 72 is formed in the outer sleeve of the member 48 to allow the member 48 to move axially of the throat 32. However, rotation of the member 48 about the throat is prevented.

The attachment means 14 of the device has a resiliently deformable silicone rubber sleeve 74 encircling the tube 26 between a stop 76 and a shoulder 78 provided by an annular slip ring 80. The stop is formed by an end cap screwed onto the tube 26.

A compression member 82 has radially spaced annular walls 84 straddling an annular wall 86 standing proud of the cap 12 of the housing 18. The inside of the wall 86 and the outside of the inner wall 84 are threaded and screwed into one another to enable the compression member 82 to be screwed towards and away from the stop 76. The member 82 has a neck 88 encircling and extending partly along the tube 26 and engaging the ring 80. Thus, as the member 82 is screwed along the wall 86 and moved towards the stop 76, the neck pushes the ring 80 against the sleeve 74. This action can compress the sleeve 74 axially and cause it to expand radially outwardly into engagement with the interior of the neck of a bottle.

The provision of the neck 88 enables the sleeve 74 to be located well within a bottle neck when it is deformed, while the slip ring helps to prevent the member 82 from twisting the sleeve as the member 82 is rotated.

The use of a screw-on end cap providing the stop 76 makes replacement of the stop, sleeve and ring relatively simple, which allows the attachment means to attach the device to the neck of any one of a wide range of bottles.

Because of the way in which the device is made, the housing can be readily adapted to have a shape similar to that of a bottle. The device may be provided with a label which, although smaller, may correspond in design to that on the bottle to which the device is to be attached. The nozzle member may, as far as possible, be designed to simulate a bottle cap.

In operation, the device is attached to a bottle by the attachment means and the bottle and device are inverted. At this time, the spring 64 ensures that the inlet is open and that the seal 44 is pressed against the valve seat 36.2 to prevent escape of liquid. However, liquid is free to flow into the chamber until the chamber is full. When the liquid is to be dispensed, a glass is placed below the press bar and is raised rapidly to lift the press bar, and thus the valve body. The pads provided on the base of the press bar help to prevent slipping of the glass against the press bar.

When the valve body is rapidly raised, it moves until the inlet is suitably closed, the seal 44 moving from the valve seat 36.2 and out of the socket 36 so that liquid is free to flow from the chamber 20 to the outlet 24 and out through the nozzle insert 48.1. As the liquid flows downwardly, replacement air enters the chamber through the hole 68, thus permitting relatively rapid emptying of the chamber.

Once the liquid has been dispensed, the press bar is released, again opening the inlet and preventing liquid from flowing to the outlet. The chamber again fills with liquid.

To enable the device to utilise alternative attachment means, such as those with screw threads for threaded engagement with a bottle, notches may be provided in a wall 84 for receiving complementary formations on a suitable alternative member fitted on the closure cap 12.

I claim:

1. A dispensing and metering device comprising attachment means to secure the device to a container, a housing defining a chamber and having an inlet and an outlet so that the chamber can be filled through the inlet with liquid from a container secured to the device by the attachment means and can be drained through the outlet, the outlet comprising an opening defined by a throat beneath the chamber, valve means movable with respect to the housing and the attachment means from a first condition in which it isolates the chamber from the outlet and opens the inlet and a second condition in which it closes the inlet and allows liquid to flow from the chamber to the outlet, the valve means having an outlet nozzle member movable to operate the valve means and including a formation co-operating with means for preventing rotation of the nozzle member, means biassing said valve means to said first condition, press means extending generally outwardly away from said outlet and engageable by a rim of a receptacle when said receptacle is located beneath said outlet for moving said valve means from said first condition to said second condition and for thereby enabling liquid to flow from said chamber and through said outlet into said receptacle, and an air bleed hole for introducing air into the chamber to replace liquid flowing from the outlet when the valve means is moved to the second condition, the air bleed hole passing through an opening into the interior of the throat between the chamber and the outlet and being suitably unobstructed when the valve means is in its second condition for permitting air to flow through the air bleed hole.

2. A device according to claim 1, wherein the outlet nozzle member is guided by the throat defining the outlet and is formed by at least part of a cap including a sleeve fitted over and guided by the throat.

3. A device according to claim 2, wherein said press means comprises a press bar which extends from opposite sides of the cap for engagement by a rim of a glass, in use, to raise the cap and thus to move said valve means.

4. A device according to claim 3, wherein the nozzle member includes a suitable nozzle arrangement to guide liquid from the outlet and to prevent it from flowing onto the press bar.

5. A device according to claim 2, wherein said biassing means comprises a spring provided in a recess in said throat and acting on said cap for biassing the valve means to the first condition in which the inlet is open and the outlet is isolated from the chamber.

6. A device according claim 1, wherein the attachment means of the device comprises a resiliently deformable sleeve located around an inlet throat, and a stop and a shoulder which are movable one towards another to compress the sleeve between them and to cause radial expansion of the sleeve, the sleeve being locatable in a bottle neck so that the sleeve can be expanded radially into engagement with the interior of the bottle neck to attach the device to the bottle neck.

7. A device according to claim 6, wherein the stop is formed by a removable element secured to the inlet throat at the end region thereof furthest from the chamber.

8. A device according to claim 6, wherein the shoulder is provided by a compression assembly for compressing the sleeve.

9. A device according to claim 8, wherein the compression assembly has a ring encircling the inlet throat and movable towards the stop by a compression member of the assembly, which member is itself movable towards the stop.

10. A device according to claim 9, wherein the compression member is screwed onto a threaded formation associated with the housing to enable it to be screwed towards and away from the stop, the ring slidably engaging a contact surface on the compression member to prevent or restrict twisting of the sleeve as the compression member is rotated.

11. A device according to claim 6, wherein the shoulder is provided on a neck which has a similar outer shape and size to the sleeve for extending for a suitable distance into the neck of a bottle before the sleeve is compressed within said bottle neck.

12. A device according to claim 6, wherein the inlet throat is a tube formed integrally with a closure cap of the housing of the device and has a partition dividing the throat along its length.

13. A device according to claim 1, wherein the housing has at least partly cylindrical sockets at opposite ends of the chamber and the valve means has annular portions for fitting closely in the cylindrical parts of respective sockets and arranged so that at least one annular portion is in a cylindrical part of a socket during substantially the whole of the travel of the valve means.

14. A device according to claim 13, wherein the annular portions of the valve means touch the walls of the cylindrical parts of the sockets as they move or are dimensioned so that there is a small clearance, the arrangement being such as to prevent any significant flow of liquid between the annular portions and the socket walls when the annular portions are within the cylindrical parts of the sockets and the valve means moves rapidly between the first and the second conditions.

15. A device according to claim 13, wherein parts of the valve means remain substantially in one or other of the sockets as the valve means moves between the first and second conditions so that the liquid cannot flow continuously from the inlet to the outlet.

16. A device according to claim 14, wherein the annular portions of the valve means also provide surfaces for engaging valve seats in the sockets.

17. A dispensing and metering device comprising attachment means to secure the device to a container, a housing defining a chamber and having an inlet and an outlet so that the chamber can be filled through the inlet with liquid from a container secured to the device by the attachment means and can be drained through the outlet, valve means movable from a first condition in which it isolates the chamber from the outlet and opens the inlet to a second condition in which it closes the inlet and allows liquid to flow from the chamber to the outlet, and an air bleed hole for introducing air into the chamber to replace liquid flowing from the outlet when the valve means is moved to the second condition, wherein the attachment means of the device comprises a resiliently deformable sleeve located around an inlet throat and locatable in a bottle neck, and a stop and a shoulder movable one toward another to compress the sleeve between them and to cause radial expansion of the sleeve, whereby the sleeve can be expanded radially into engagement with the interior of a bottle neck to attach the device to the bottle neck.

* * * * *